(12) United States Patent
Levi et al.

(10) Patent No.: US 10,019,533 B2
(45) Date of Patent: Jul. 10, 2018

(54) METHOD FOR REGULATING USAGE OF A BROWSER STORE FOR A WEB BROWSER FEATURING TABBED WEB PAGE VIEWING BASED ON BROWSER ACTIVITY

(71) Applicant: Avast Software B.V., Schiphol (NL)

(72) Inventors: Shaul Levi, Amsterdam (NL); Shareen Racke-Bodha, Duivendrecht (NL); Jessica Downey, Amsterdam (NL); Or Hiltch, Rishon LeZion (IL)

(73) Assignee: Avast Software s.r.o., Praha (CZ)

( * ) Notice: Subject to any disclaimer, the term of this patent is extended or adjusted under 35 U.S.C. 154(b) by 342 days.

(21) Appl. No.: 14/718,901

(22) Filed: May 21, 2015

(65) Prior Publication Data
US 2015/0347616 A1 Dec. 3, 2015

Related U.S. Application Data

(60) Provisional application No. 62/003,175, filed on May 27, 2014.

(51) Int. Cl.
*G06F 17/30* (2006.01)
(52) U.S. Cl.
CPC .. *G06F 17/30905* (2013.01); *G06F 17/30867* (2013.01); *G06F 17/30896* (2013.01); *G06F 17/30899* (2013.01)
(58) Field of Classification Search
None
See application file for complete search history.

(56) References Cited

U.S. PATENT DOCUMENTS

| | | | | |
|---|---|---|---|---|
| 7,552,210 B1* | 6/2009 | Blum | ...................... | H04L 67/02 709/202 |
| 8,762,878 B1* | 6/2014 | Weber | ................... | G06F 9/4443 715/777 |
| 8,775,923 B1* | 7/2014 | Kroeger | ............ | G06F 17/30902 715/200 |
| 9,070,211 B1* | 6/2015 | Kroeger | ................. | G06T 11/00 |

(Continued)

OTHER PUBLICATIONS

International Search Report.

*Primary Examiner* — Asher D Kells
(74) *Attorney, Agent, or Firm* — Kramer Levin Naftalis & Frankel LLP

(57) ABSTRACT

Methods and systems for administering a browser store for computing device web browser applications, particularly browsers featuring tabbed viewing of web pages. A qualifying trigger event, such as a change in the current active tab of the browser, or a navigation to a URL in the active tab, is detected by an exemplary system. The system, having been monitoring user interaction with the browser's tabs, regulates the browser store such that, upon detecting a trigger event, only data (e.g., cookies) pertaining to the web site whose web page is presently displayed in the browser's active tab is retained. Any other data unrelated to the web site is copied to a virtual memory for future reference and purged from the browser store. Additionally, any data pertaining to the web site that may have been previously transferred to the virtual memory is retrieved therefrom and relocated to the browser store. Moreover, any such data retrieved from the virtual memory that require updating, e.g., upon request or instruction by the site's web server, is updated or replaced as appropriate.

13 Claims, 10 Drawing Sheets

(56) References Cited

U.S. PATENT DOCUMENTS

| | | | |
|---|---|---|---|
| 9,332,056 B2 * | 5/2016 | Ross | ............... H04L 67/02 |
| 9,436,762 B1 * | 9/2016 | Lau | ............... G06F 17/30861 |
| 9,799,380 B2 * | 10/2017 | Liabraaten | ............... G11C 7/1075 |
| 2002/0156781 A1 * | 10/2002 | Cordray | ............... G06F 17/30861 |
| 2009/0199285 A1 | 8/2009 | Agarwal et al. | |
| 2012/0060083 A1 * | 3/2012 | Yuan | ............... G06F 17/30899 |
| | | | 715/234 |
| 2012/0084133 A1 | 4/2012 | Ross et al. | |
| 2013/0061160 A1 * | 3/2013 | Tseng | ............... G06F 17/30905 |
| | | | 715/760 |
| 2016/0062958 A1 * | 3/2016 | Shirakawa | ............... G06F 17/2205 |
| | | | 715/234 |
| 2016/0139753 A1 * | 5/2016 | Sato | ............... G06F 17/30 |
| | | | 715/777 |

\* cited by examiner

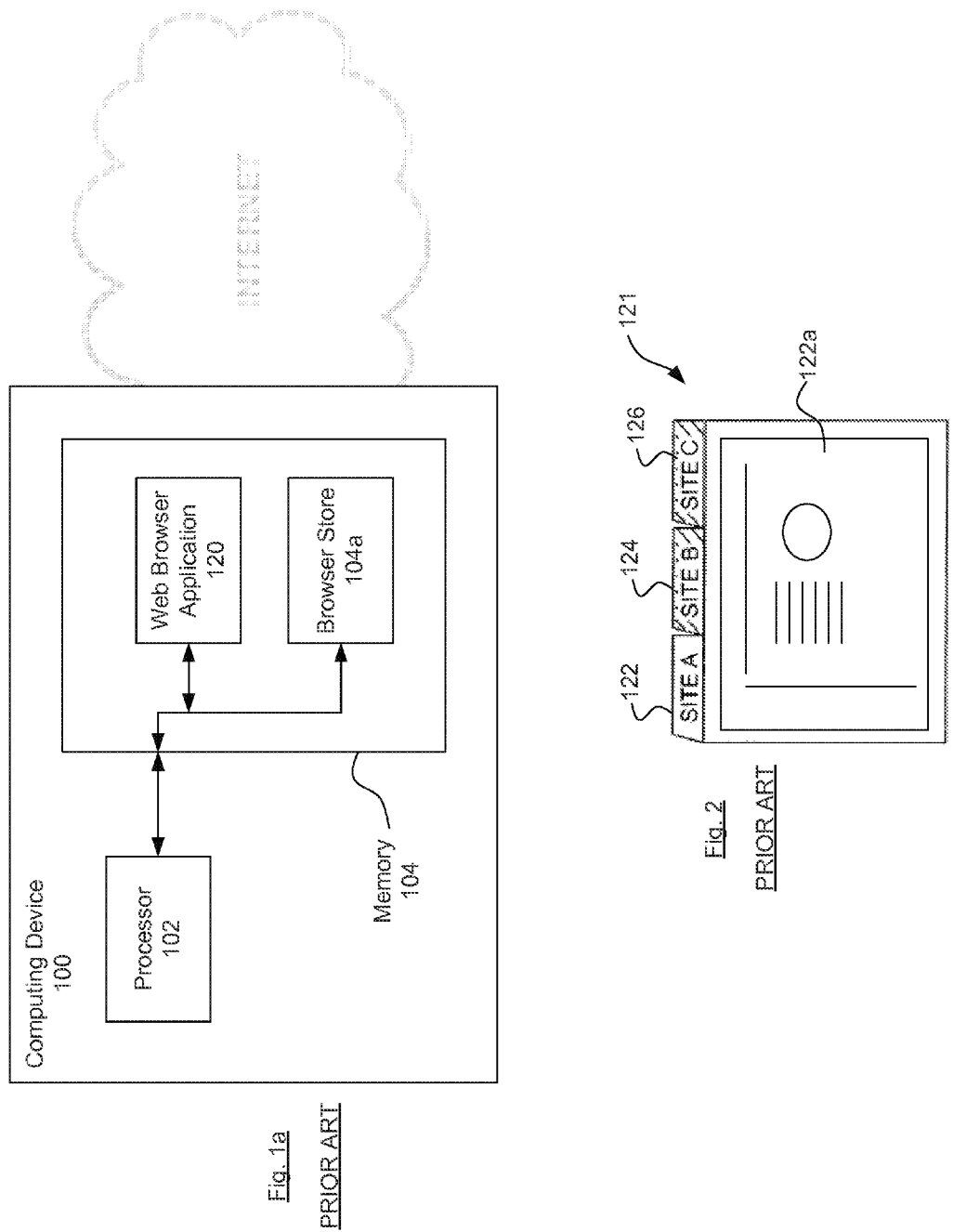

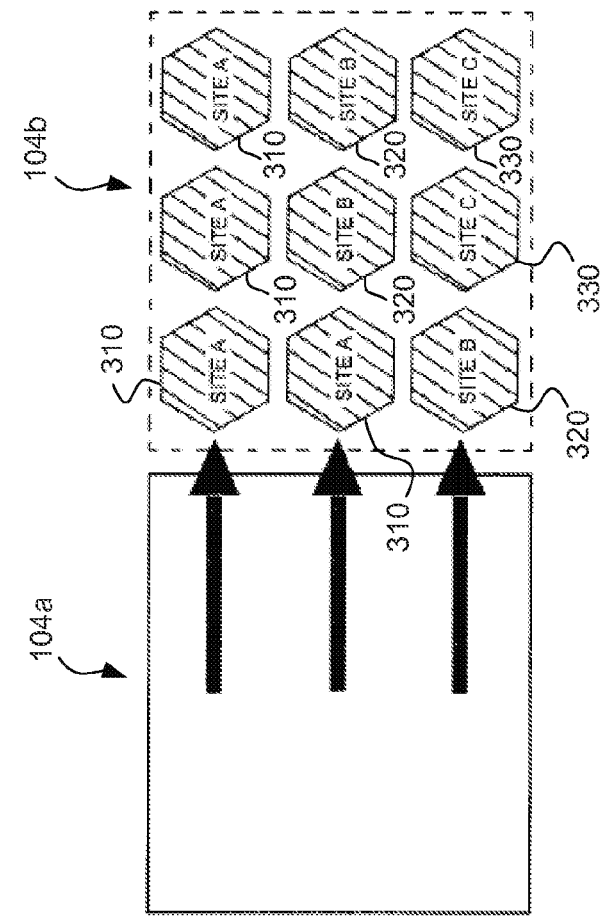
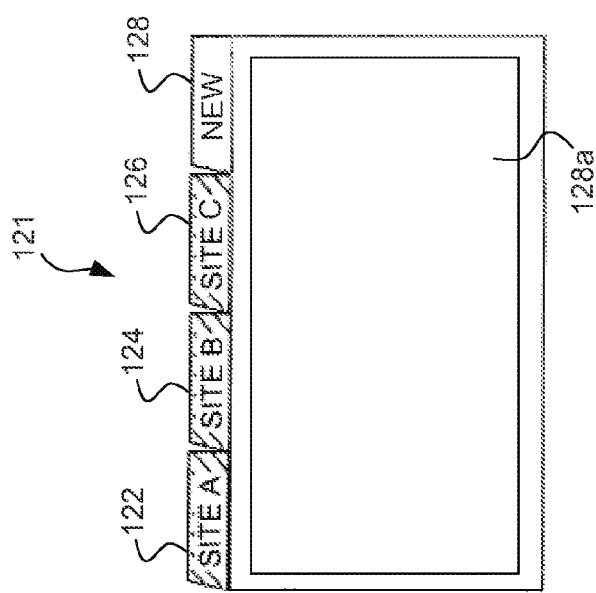
FIG. 3b

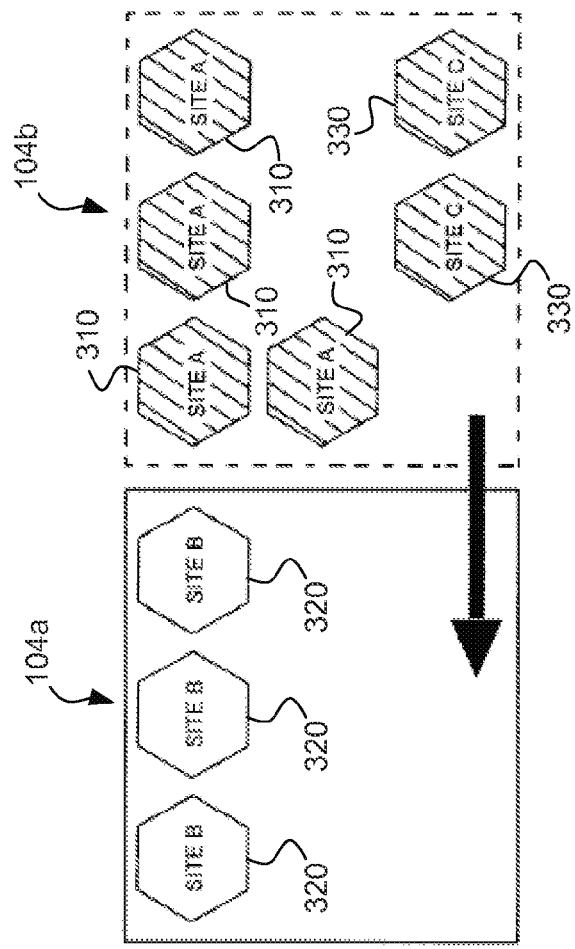
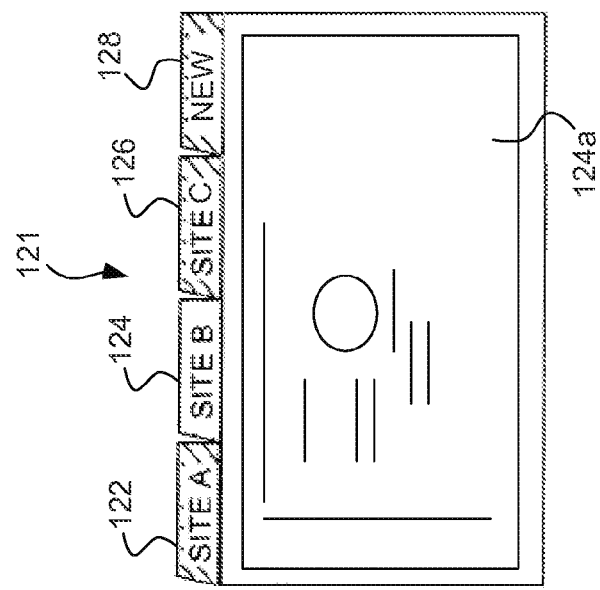
Fig. 3c

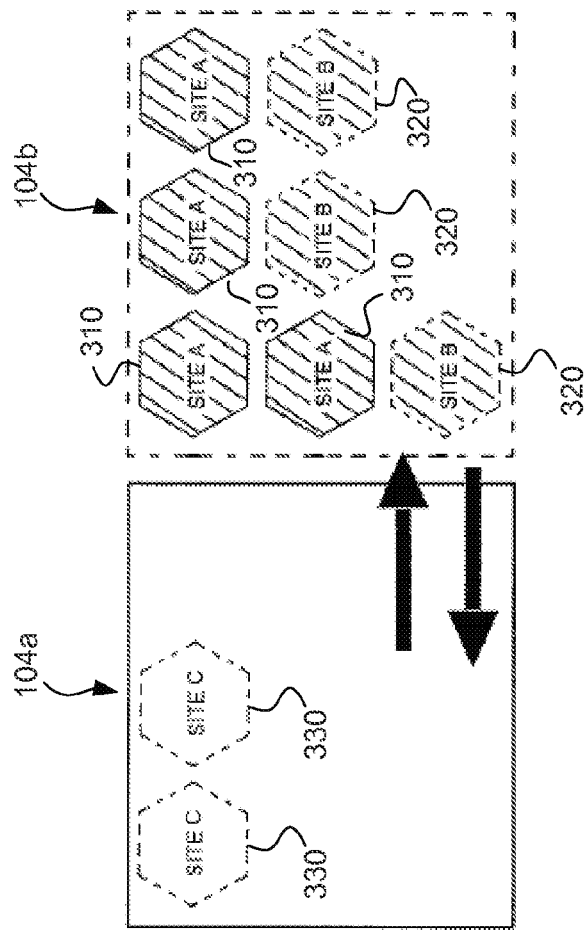
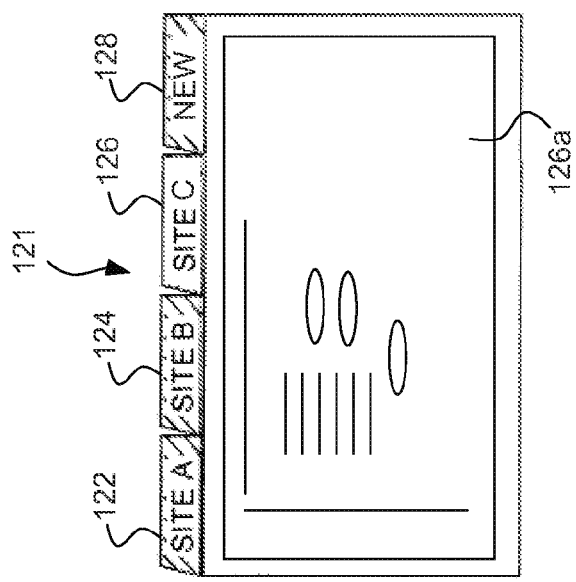
Fig. 3d

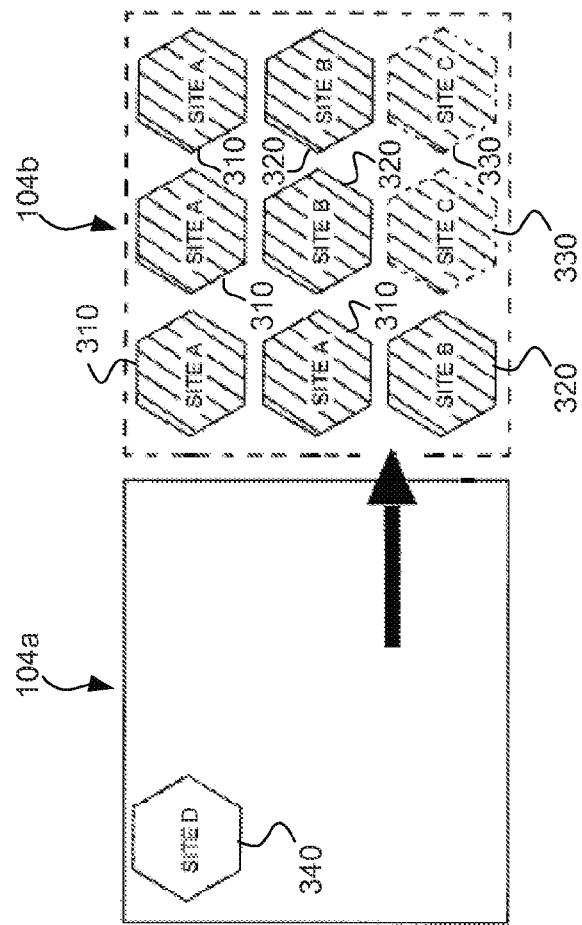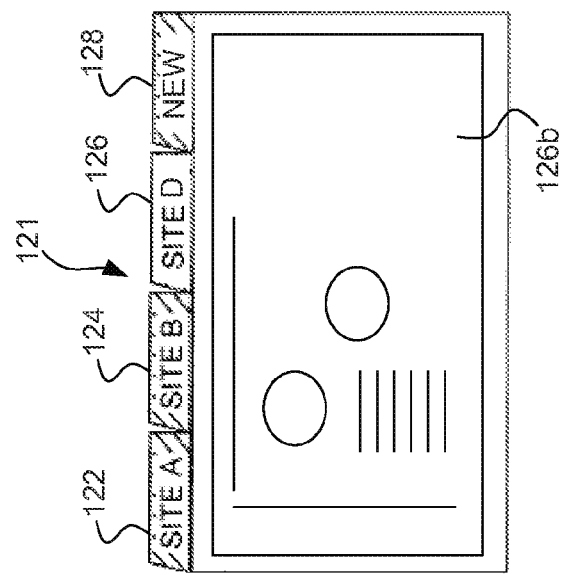
Fig. 3e

METHOD FOR REGULATING USAGE OF A BROWSER STORE FOR A WEB BROWSER FEATURING TABBED WEB PAGE VIEWING BASED ON BROWSER ACTIVITY

CROSS-REFERENCE TO RELATED PROVISIONAL APPLICATION

This application claims the benefit of U.S. Provisional Patent Application No. 62/003,175, filed on May 27, 2014, the disclosure of which is hereby incorporated herein by reference in its entirety.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention generally relates to improvements in browser store administration for computing device web browser applications, particularly browsers featuring tabbed viewing of web pages, in which the browser store is reserved exclusively for retaining data (e.g., cookies) pertaining to the web site whose associated web page is presently displayed in the browser's active tab.

BACKGROUND OF THE INVENTION

Today's computing devices feature web browsers that allow users to access content on the Internet. A web browser is a software application that provides an interface (e.g., a "window") for receiving user inputs and displaying data retrieved from the web. For ease of accessing multiple web sites simultaneously, many web browsers feature "tabbed" viewing of web pages, where multiple web site uniform resource locators (URLs) are accessible in a single window via individual tabs. Only one tab is selectable to be "active" at a time, and only the web page corresponding to the web site accessed in that current active tab is displayed in the browser window—each of the other tabs is treated as "inactive" and the web page therein is hidden from view unless that tab is made active.

Web sites oftentimes deliver auxiliary data (in addition to web page content for display) to web browsers that help track visitors to the sites and their activities during the visits. This auxiliary data includes cookies, hypertext markup language (HTML) data (e.g., HTML5 localStorage data), multimedia content (e.g., Flash objects), and the like. A cookie is simply a text file that a web server instructs a web browser to create and store upon its access to the site. It is usually created at the first visit, and may be subsequently updated upon future visits. For each cookie issued by a web site, the same information is stored on the web server—upon a user's subsequent visit to the site, the server retrieves the cookie via the web browser to identify and, in some instances, authenticate the user. The text file typically contains information in the form of "name-value pairs", consisting of a variable name (e.g., User_ID) and an associated value (e.g., A8A62818DF47), and is stored in a dedicated browser store (e.g., a folder) in non-volatile memory (e.g., a hard disk) on the user's computer.

While the tabbed viewing configuration has enhanced user experiences on the web, users often have the false impression of a direct, contained, and private communication channel between the user and/or the user's computing device and the web site whose web page is presently displayed in the browser's active tab. This could not be further from the truth, however, since each web site accessed via a browser tab may deposit data to the browser store, regardless of whether that tab is active. In other words, all web sites accessed via the browser's tabs, whether active or not, share a common browser store and may conduct operations in the browser store throughout a user's web browsing session. Moreover, depending on whether those sites have partnered with third party content providers, those providers may also utilize the browser store as well. This raises privacy concerns as, in many instances, third parties may deposit content onto visitors' computing devices behind the scenes, and may use the content to track the visitors' browsing activities, and even the web sites themselves may not be privy to such content (or the size thereof). In fact, the content is also oftentimes encrypted by the third parties, obscuring it from view and analysis by the web sites.

SUMMARY OF THE INVENTION

Generally speaking, it is an object of the present invention to improve over conventional web browsers by providing a browser administering system and process that regulates usage of a browser store based on browser activity. This regulation restricts the store from retaining data other than that pertaining to the web page presently displayed in the browser's active tab, resulting in a dynamic store configuration reserved for the web site whose web page is currently being viewed by a user.

A method for administering a browser store for a web browser application on a computing device, wherein multiple web sites are accessible via individual tabs of the browser application, and in which the browser store is reserved exclusively for retaining data pertaining to a web site whose associated web page is presently displayed in the browser application's active tab, according to an embodiment of the present invention is provided. The method includes monitoring, using at least one data processor of the computing device, activity within the browser application, detecting, using the at least one data processor, at least one event in the browser application indicative of a need to regulate the browser store, identifying, using the at least one data processor, the web site whose web page is presently displayed in the browser application's active tab, purging, using the at least one data processor, data in the browser store unrelated to the web site whose web page is presently displayed in the active tab, and retrieving from a virtual memory on the computing device and relocating to the browser store, using the at least one data processor, data pertaining to the web site whose web page is presently displayed in the active tab.

A system for administering a browser store for a web browser application on a computing device, wherein multiple web sites are accessible via individual tabs of the browser application, and in which the browser store is reserved exclusively for retaining data pertaining to a web site whose associated web page is presently displayed in the browser application's active tab, according to an embodiment of the present invention is also provided. The system includes a monitoring module configured to monitor activity within the browser application, detect at least one event in the browser application indicative of a need to regulate the browser store, and identify the web site whose web page is presently displayed in the browser application's active tab. The system also includes a control module configured to cause data in the browser store unrelated to the web site whose web page is presently displayed in the active tab to be purged, and cause data pertaining to the web site whose web page is presently displayed in the browser application's active tab to be retrieved from a virtual memory on the computing device and relocated to the browser store.

A computer program product including a non-transitory medium storing computer executable program logic for administering a browser store for a web browser application on a computing device, wherein multiple web sites are accessible via individual tabs of the browser application, and in which the browser store is reserved exclusively for retaining data pertaining to a web site whose associated web page is presently displayed in the browser application's active tab, according to an embodiment of the present invention is also provided. The computer executable program logic is configured to cause at least one data processor of the computing device to monitor activity within the browser application, detect at least one event in the browser application indicative of a need to regulate the browser store, identify the web site whose web page is presently displayed in the browser application's active tab, purge data in the browser store unrelated to the web site whose web page is presently displayed in the active tab, and retrieve from a virtual memory on the computing device and relocate to the browser store, data pertaining to the web site whose web page is presently displayed in the active tab.

In various embodiments of the present invention, a browser store administering system monitors user interaction with a web browser featuring tabbed browsing of web pages, and regulates data storage in the browser store accordingly. The browser store may retain data deposited, or caused to be deposited, by web sites accessed by the browser. The administering system may be installed as an extension or complement to the browser. Upon installation, all data in the browser store is relocated to a virtual memory (e.g., an in-memory variable in a hash table data structure, functioning as a virtual cookie store). For example, for cookies in the browser store, the administering system copies the names of the cookies, their corresponding URLs, and any associated values (e.g., JSON representations of the cookies' data and properties) into the virtual memory. After copying, the administering system purges the data from the browser store to clear it of its contents.

In at least one embodiment, the administering system monitors the web browser via event listeners configured to detect predefined browser events. Qualifying browser events include the creation of new browser tabs, user selections of the tabs, user navigation to web sites via the tabs, and the storage of cookies in the browser store. As one example, a qualifying event may occur upon the creation of a new tab that is made active (and where the browser is set to automatically access a particular web site URL, such as a home page, in each newly-created tab). As another example, a qualifying event may occur upon detecting a user request to access a specific URL via the active tab. When such events occur in a conventional browser application, the browser may simply access the appropriate web site to retrieve web page content for display in the tab, and create and store any auxiliary data (e.g., cookies, etc.) in the browser store requested by the web server. In embodiments of the present invention, however, the administering system can analyze all the data in the browser store, copy all data therein unrelated to the web site (e.g., unrelated to the web site's domain) accessed in the active tab to a virtual memory, and purge, or otherwise delete, the copied data from the browser store. Furthermore, the administering system can also perform a look-up operation in the virtual memory to retrieve any data related to the web site (e.g., related to the web site's domain), and restore this data to the browser store. Moreover, if any of the restored data contains user authentication information (e.g., login data) for the web site, the restoration thereof can also effect a user login on the site.

In this way, the browser store is regulated such that it is reserved exclusively for the web site whose web page is presently displayed in the browser's active tab, and not for any other party, such as a third party that may be partnered with the web site. That is, for example, any content (such as cookies) that a third party partnered with the web site may deposit into the browser store would be relocated to the virtual memory (since the content's domain would be different from the web site's domain), and any such third party content would not be retrieved and returned to the browser store upon subsequent access to the web site by the browser application.

According to at least one embodiment, the administering system monitors browser-related activities and regulates data storage in the browser store in real-time. For example, the administering system can analyze each cookie prior to, during, or after it is deposited in the browser store. If, at any point, a particular cookie does not correspond to the web site whose web page is currently presented in the browser's active tab, the cookie is automatically transferred to the virtual memory, and purged from the browser store.

Web sites also typically set expiration dates for their cookies. In a conventional web browser application, expired cookies are often left in the browser store, where only upon subsequent access by the browser to the corresponding web sites, do the web servers instruct the browser to replace them. According to at least one embodiment of the present invention, the administering system can periodically analyze and purge any cookies in the virtual memory that have expired. This analysis can be performed at regular intervals, for example, every hour, or at preset times.

According to other embodiments, the administering system can also update cookies with new information provided by accessed web sites. For example, if the browser's active tab is navigated to a web site URL whose server had previously deposited a cookie in the browser store (e.g., a cookie that had subsequently been transferred by the administering system to the virtual memory), the administering system can retrieve the cookie from the virtual memory, update it with the new information, and store the updated version in the browser store and/or the virtual memory.

Still other aspects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1a depicts a block diagram of a computing device having a web browser application installed thereon, according to the prior art;

FIG. 2 depicts an example of a browser window of a web browser application including multiple web sites accessed via individual tabs, according to the prior art;

FIG. 3b depicts an example of a browser window and illustrates the transfer of contents from a browser store to a virtual storage area in a computing device, upon the installation of a browser store administering system onto the computing device, according to an embodiment of the present invention;

FIG. 3c depicts an example of a browser window and illustrates the transfer of contents from a virtual storage area in a computing device to a browser store, subsequent to the installation of a browser store administering system onto the computing device, according to an embodiment of the present invention;

FIG. 3d depicts an example of a browser window and illustrates the transfer of contents between a virtual storage area in a computing device and a browser store, when a previously inactive browser tab is selected to be active, according to an embodiment of the present invention;

FIG. 3e depicts an example of a browser window and illustrates the transfer of contents from a browser store to a virtual storage area, when a browser application's active tab is navigated to a different URL, according to an embodiment of the present invention;

DETAILED DESCRIPTION OF THE PREFERRED EMBODIMENTS

Figure 1B:
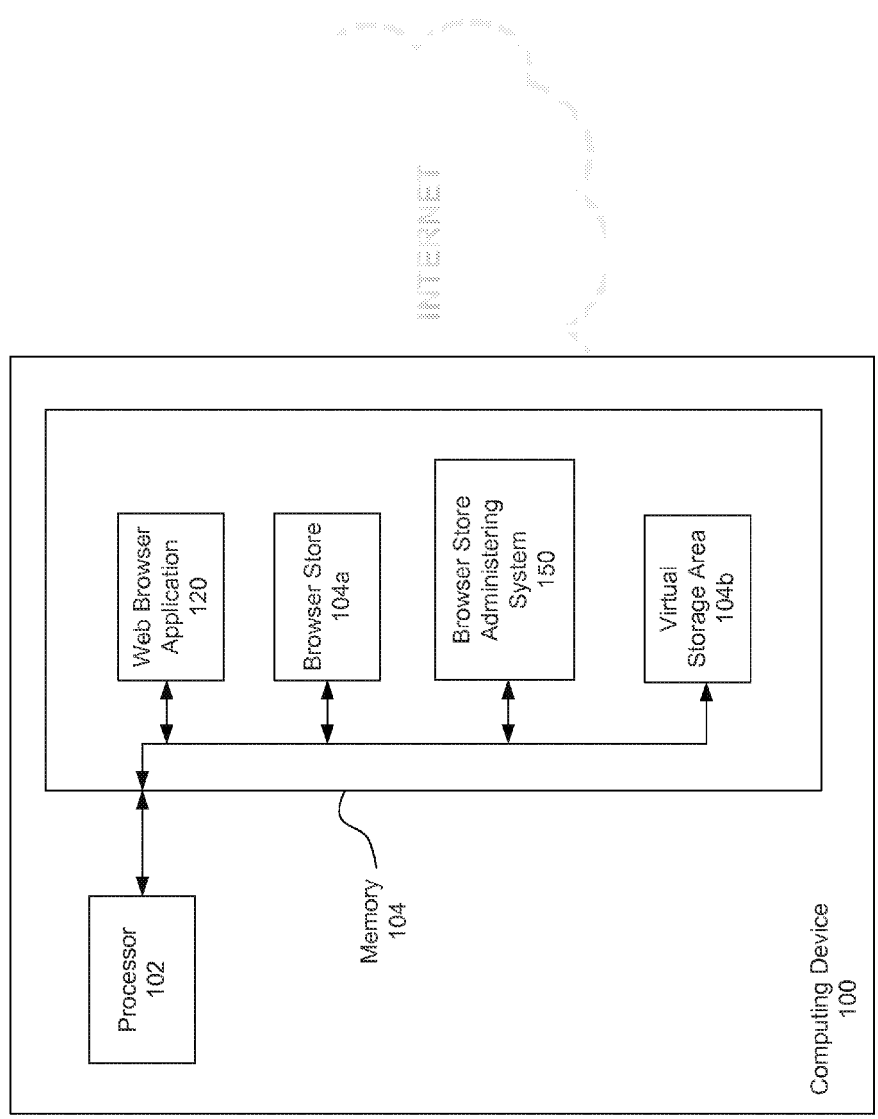
FIG. 1b depicts a block diagram of a computing device having a web browser application and a browser store administering system installed thereon, according to an embodiment of the present invention.

A block diagram of a computing device 100 having a web browser application 120 installed thereon according to the prior art is illustrated in FIG. 1a. Computing device 100 includes a processor 102 (e.g., a microprocessor or other data processing device) and a memory 104 (e.g., non-volatile memory, volatile memory, or both). Depending on its configuration, computing device 100 may include multiple processors and memories. An operating system may be run using processor 102 and may execute software applications, such as browser application 120. Memory 104 includes a browser store 104a designated for retaining web content (e.g., cookies, HTML5 data, flash objects, etc.) associated with web sites accessed by browser application 120. Although FIG. 1a shows browser application 120 (or its code) being stored in memory 104, the application may be stored remotely from computing device 100.

Browser application 120 features tabbed viewing of web pages, where multiple web sites are accessible via individual browser tabs. FIG. 2 depicts an example of a browser window 121 of web browser application 120, including multiple web sites A, B, and C individually accessed via tabs 122, 124, and 126, according to the prior art. As shown in FIG. 2, tabs 124 and 126 have been used to access web sites B and C, but are currently inactive (as represented by shading in the tabs' graphics), and thus the web pages associated with web sites B and C are hidden from view in browser window 121. Tab 122 has been used to access web site A, and in contrast to tabs 124 and 126, is active (as represented without shading in the tab's graphic), and thus web page 122a associated with web site A is presented in browser window 121.

Another block diagram of computing device 100 according to an embodiment of the present invention is illustrated in FIG. 1b. FIG. 1b differs from FIG. 1a in that an additional browser store administering system 150 is installed, and an additional virtual storage area 104b is created in memory 104. In the computing device shown in FIG. 1b, processor 102 can execute both browser application 120 as well as administering system 150. In at least one embodiment, administering system 150 is installed on computing device 100 as an extension of browser application 120. For example, administering system 150 may be implemented as one or more background scripts tied to the operation of browser application 120 (e.g., such as an extension of the GOOGLE CHROME BROWSER). Alternatively, administering system 150 may be a standalone application configured to interact with browser application 120.

Figure 1C:
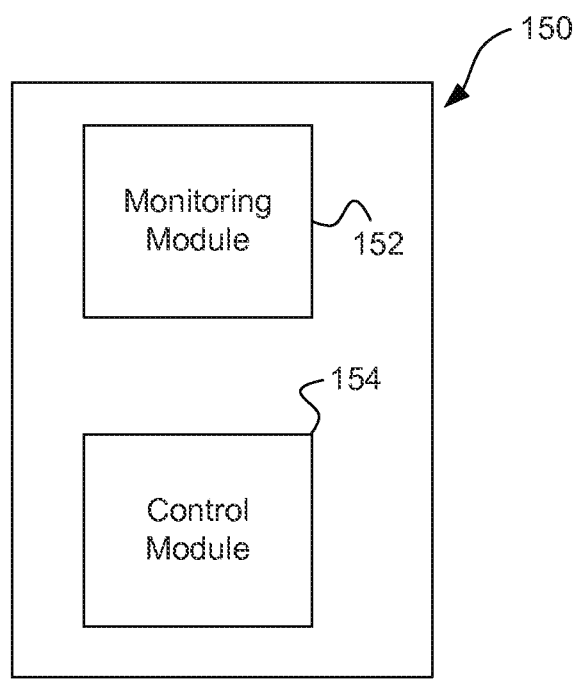
FIG. 1c depicts a block diagram of a browser store administering system including various modules, according to an embodiment of the present invention.

Administering system 150 can include logic code implemented in one or more modules. For example, as shown in FIG. 1c, in at least one embodiment, administering system 150 can include a monitoring module 152 configured to monitor activity within browser application 120 (including identifying web sites, such as sites A, B, and C of FIG. 2, accessed via the various tabs of the browser application), and detect certain qualifying browser-related events that require action by the administering system for browser store regulation purposes, as well as a control module 152 that communicates with processor 102 and/or browser application 120 to effect various operations on browser store 104a, virtual storage area 104b, and/or other portions of memory 104 or components of computing device 100. According to at least another embodiment, some or all of the modules in administering system 150 may be combined, and additional modules may be included to implement the aforementioned functions.

Figure 3A:
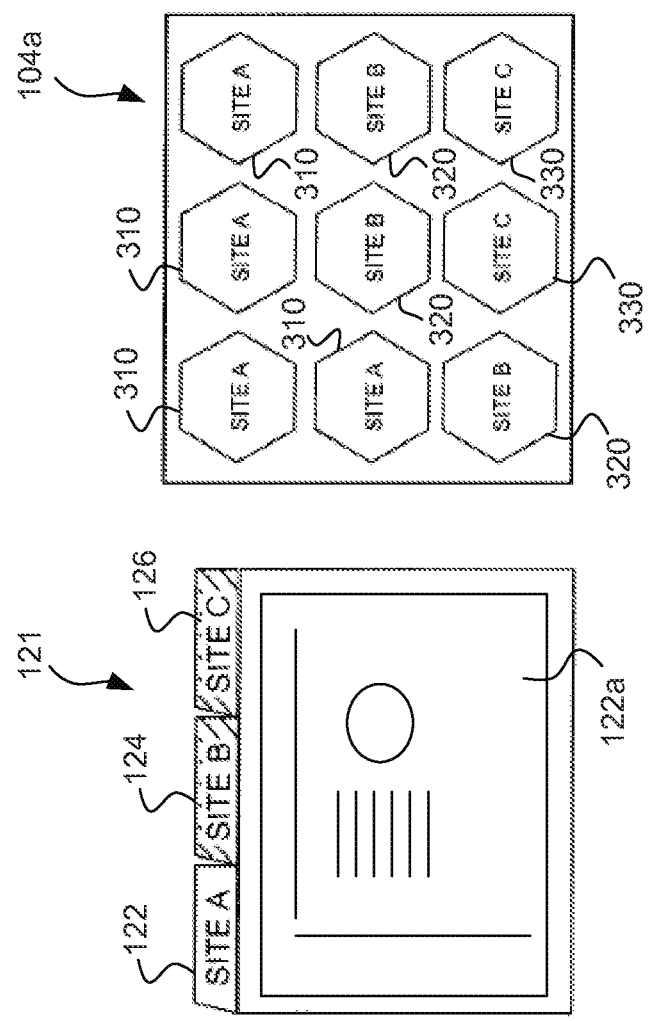
FIG. 3a depicts an example of a browser window and contents stored in a browser store, prior to the installation of a browser store administering system onto a computing device, according to an embodiment of the present invention.

FIG. 3a illustrates an example of browser window 121 and contents stored in browser store 104a, prior to the installation of administering system 150 onto computing device 100. As shown in FIG. 3a, tab 122 is active and tabs 124 and 126 are inactive. Consequently, only web page 122a associated with web site A accessed via tab 122 is displayed in browser window 121. Additionally, data items 310, 320, and 330 (e.g., cookies) associated with web sites A, B, and C are stored in browser store 104a.

During or upon the installation of administering system 150 onto computing device 100, administering system 150 can cause virtual storage area 104b to be created or apportioned in memory 104. In various embodiments, virtual storage area 104b is an in-memory variable in the data structure of a hash table, and serves as a virtual store (e.g., a virtual cookie store). The variable's content can be persisted to the browser application 120's storage system (e.g., HTML5 local storage, storage for the GOOGLE CHROME BROWSER, etc.) upon installation of administering system 150, and can remain persisted even upon changes to content in the variable. In other words, the variable can be stored in non-volatile memory, where its state is retained even when computing device 100 is powered OFF. During or upon installation, administering system 150 can also cause all data (e.g., cookies, HTML data, flash objects, and the like) in browser store 104a to be copied to virtual storage area 104b. FIG. 3b depicts an example of browser window 121 and illustrates the transfer of contents from browser store 104a to virtual storage area 104b, upon the installation of administering system 150 onto computing device 100. As shown in FIG. 3b, a new tab 128 is created and made active, and a blank page corresponding to new tab 128 is presented in browser window 121. Additionally, all data in browser store 104a is copied to virtual storage area 104b and purged from browser store 104a, rendering the browser store empty. For example, all cookies and associated data in browser store 104a, including file names, corresponding URLs, and associated values (e.g., JSON representations of the cookies' data and properties), may be copied from browser store 104a to virtual storage area 104b, and subsequently purged from browser store 104a to clear it of all its contents.

In at least one embodiment, rather than automatically creating new tab 128 upon the installation of administering system 150, the tab that is active, immediately prior to the installation, may remain active, and the web page associated with that tab may remain displayed in browser window 121. In this case, all the data in browser store 104a pertaining to the web site whose web page is presently displayed in the active tab can remain in browser store 104a, and only the data unrelated to the web site is copied to virtual storage area 104b and subsequently purged from browser store 104a.

According to various embodiments, administering system 150 can include one or more event handlers (e.g., included as part of monitoring module 152 and/or control module 154) configured to detect browser-related activities (e.g., events where a private and contained communication channel between the user and/or the user's computing device and the web site whose web page is presently displayed in the browser's active tab, may be "broken"). The event handlers can be installed during installation of administering system 150 (e.g., after data in browser store 104a is copied to virtual storage area 104b and purged from browser store 104a). In at least one embodiment, the event handlers can be configured to detect the creation of new tabs (e.g., via user selection of an add tab option in browser window 121), user selections of any of the tabs (e.g., tabs 122, 124, and 126) to be active, navigation (e.g., via user input) to URLs using the tabs, and the creation and/or storage of data (e.g., cookies) in browser store 104a (e.g., instructed by a web site, or by a third party associated with the web site and whose web page is presented in an inline frame, or iframe, in the web site's web page).

Administering system 150 can also include logic that regulates the content stored in browser store 104a and virtual storage area 104b based on detected browser events. In various embodiments, administering system 150 can include logic that analyzes the data in browser store 104a, and copies any data unrelated to the web site whose web page is presently displayed in the browser's active tab, from browser store 104a to virtual storage area 104b. In at least one embodiment, administering system 150 can additionally include logic that effects look-up operations in virtual storage area 104b for data pertaining to the web site, and relocates any such data from virtual storage area 104b to browser store 104a.

As one example, at some point after administering system 150 is installed onto computing device 100, a user may select a previously opened, but inactive, tab to be active. Browser application 120 may issue a corresponding browser event, and an event handler in administering system 150 can detect the event and regulate browser store 104a accordingly. FIG. 3c depicts an example of browser window 121 and illustrates the transfer of contents from virtual storage area 104b to browser store 104a, at some point after administering system 150 is installed onto computing device 100. As shown in FIG. 3c, tab 124 is selected as the active tab. Since tab 124 had already previously been opened and used to access web site B, administering system 150 can identify web site B, and can cause any data in browser store 104a to be analyzed to distinguish data pertaining to web site B from data unrelated thereto (e.g., based on web site Ws domain name). Administering system 150 can also cause all such unrelated data in browser store 104a to be copied to virtual storage area 104b, and subsequently purged from browser store 104a. In the example shown in FIG. 3c, since browser store 104a had just been cleared of its contents upon the installation of administering system 150, no analysis of the data therein would be required. However, administering system 150 can, nevertheless, additionally cause all data in virtual storage area 104b to be analyzed to identify any data therein that pertains to web site B. For example, administering system 150 can identify that data items 320 pertain to web site B and that data items 310 and 330 do not. Administering system 150 can subsequently cause the data pertaining to web site B (e.g., data items 320) to be copied or relocated from virtual storage area 104b to browser store 104a, thereby effecting regulation of the browser store such that it is reserved exclusively for web site B.

As another example, a user may select an inactive tab to be active. In response, browser application 120 may issue another corresponding browser event, and an event handler in administering system 150 can detect the event and regulate browser store 104a accordingly. FIG. 3d depicts an example of browser window 121 and illustrates the transfer of contents between browser store 104a and virtual storage area 104b, when previously inactive tab 126 is selected to be active. Whereas tab 124 may have previously been active (e.g., in FIG. 3c), in FIG. 3d, tab 126 has now been selected to be active and so a corresponding web page 126a (rather than web page 124a) is displayed in browser window 121. Since tab 126 had already previously been opened and used to access web site C, administering system 150 can identify the web site C, and can cause any data in browser store 104a to be analyzed to distinguish data pertaining to web site C from data unrelated thereto (e.g., based on web site C's domain name). Here, only data items 320 corresponding to web site B was present in browser store 104a, prior to tab 126 being made active. Accordingly, administering system 150 can cause data items 320 to be copied from browser store 104a to virtual storage area 104b, and subsequently purged from browser store 104a. Administering system 150 can additionally cause all data in virtual storage area 104b to be analyzed to identify any data therein that pertains to web site C. For example, administering system 150 can identify that data items 330 pertain to web site C and that data items 310 and 320 do not. Administering system 150 can subsequently cause data items 330 pertaining to web site C to be copied or relocated from virtual storage area 104b to browser store 104a, thereby effecting regulation of the browser store such that it is reserved exclusively for web site C.

As yet another example, when a user navigates to a different web site URL using the browser's current active tab, browser application 120 may issue yet another corresponding browser event (e.g., an "On-Active-Tab-Navigation-Changed" event). An appropriate event handler (e.g., an On-Active-Tab-Navigation-Changed event handler) in administering system 150 can detect this event and regulate browser store 104a accordingly. FIG. 3e depicts an example of browser window 121 and illustrates the transfer of contents from browser store 104 to virtual storage area 104b, when the URL in an active tab is changed. For example, tab 126 may have been active (e.g., in FIG. 3d) immediately prior to the URL change. In FIG. 3e, tab 126 is now navigated to a new URL for a different web site D. Browser application 120 may access the requested site URL and retrieve an associated web page 126b for display in browser window 121. The web site's server may also provide one or more pieces of auxiliary data (e.g., cookies), such as data item 340, for storage in browser store 104a, or may otherwise instruct browser application 120 to create such data for storage therein. Prior to, during, or after the access, but at some point after tab 126 is navigated to the new URL, administering system 150 can identify the new URL, and can cause all data in browser store 104a to be analyzed to distinguish data pertaining to web site D from data unrelated thereto (e.g., based on web site Ws domain name). In this example, data items 330 (pertaining to web site C whose web page was previously presented in tab 126) is distinguished from data item 340 (pertaining to new web site D). Administering system 150 can also cause such unrelated data (e.g., data items 330) to be copied to virtual storage area 104b, and subsequently purged from browser store 104a. In at least one embodiment, administering system 150 can additionally cause the data in virtual storage area 104b to be analyzed to identify any data therein that are related to web site D. Here, since web site D has never before been accessed by browser application 120, no data items are copied or relocated. However, if web site D had previously been accessed by browser application 120, then any data items pertaining thereto and stored in virtual storage area 104b can be copied or relocated therefrom to browser store 104a.

Accordingly, as can be appreciated from the foregoing, administering system 150 can continually regulate browser store 104a in real-time such that it is reserved exclusively for the web site whose web page is presently displayed in the browser's active tab. All data unrelated to that web site is purged from browser store 104a and moved to virtual storage area 104b for later reference or recall as necessary.

Administering system 150 can effect any of the aforementioned operations (e.g., the analysis of data in browser store 104a and virtual storage area 104b, copying and transferring of data between the browser store and the virtual storage area, etc.) in any manner. According to at least one embodiment, administering system 150 can instruct processor 102 to perform some or all of these operations. In at least another embodiment, administering system 150 can instruct either the operating system or browser application 120 or both to perform the operations.

Additionally, administering system 150 can also cause the analysis of data in browser store 104a and virtual storage area 104b, purging of data in the browser store, and transfer of data between the browser store and the virtual storage area, in any order. In at least one embodiment, administering system 150 can first analyze the data in browser store 104a, copy data over to virtual storage area 104b, and purge the copied data from browser store 104a, and only subsequently analyze the data in virtual storage area 104b for relocation to browser store 104. In at least another embodiment, administering system 150 can cause the data in virtual storage area 104b to be analyzed, prior to effecting the other operations on browser store 104a. In yet at least another embodiment, administering system 150 can effect the analyses and the copying, purging, and transferring operations substantially simultaneously.

Furthermore, administering system 150 can cause the data in browser store 104a and virtual storage area 104b to be analyzed in any manner. In at least one embodiment, the analysis can be conducted one data item at a time (e.g., one cookie at a time). In at least another embodiment, the analysis can be conducted simultaneously on a group of data items. In any case, the URL associated with each data item can be identified to determine if the data item is related to the web site whose web page is presently display in the browser's active tab. In some instances, the data items may also include expiration information. For example, cookies usually include expiration dates, which, when reached, cause the cookies to become invalid. In at least one embodiment, administering system 150 can automatically analyze (e.g., via batch process) and purge expired data from either browser store 104a or virtual store 104b. The analysis can, for example, be performed periodically (e.g., every hour) or at predefined times.

According to various embodiments, administering system 150 can also determine whether any data in browser store 104a and/or virtual storage area 104b requires updating. This determination can occur when new data (e.g., cookies) is set by a web site during user browsing. In at least one embodiment, if the browser's active tab is navigated to a web site URL that had previously been accessed by browser application 120 and whose web server had previously deposited one or more cookies in browser store 104a (e.g., as described above with respect to FIG. 3d), administering system 150 can identify those cookies in virtual storage area 104b, and cause them to be replaced or updated with any new information now being sent by the web server. For example, browser application 120 may issue a predefined event when a web server instructs the browser application to set a cookie. Administering system 150 can detect the event and determine whether a cookie for the web site already exists in browser store 104a or virtual storage area 104b. If a cookie already exists, administering system 150 can cause the cookie to be updated with any new information in the new cookie or cause the old cookie to be replaced with the new one. When a subsequent qualifying event (e.g., a different URL being accessed in the active tab, a previously inactive tab being made active, etc.) is issued by browser application 120 and detected by administering system 150, administering system 150 can copy all data unrelated to the web site whose web page is presently displayed in the browser's active tab (including the replaced or updated cookie for the prior web site) to virtual storage area 104b, and clear browser store 104a of all its contents other than the data pertaining to the now active web site.

Figure 4:
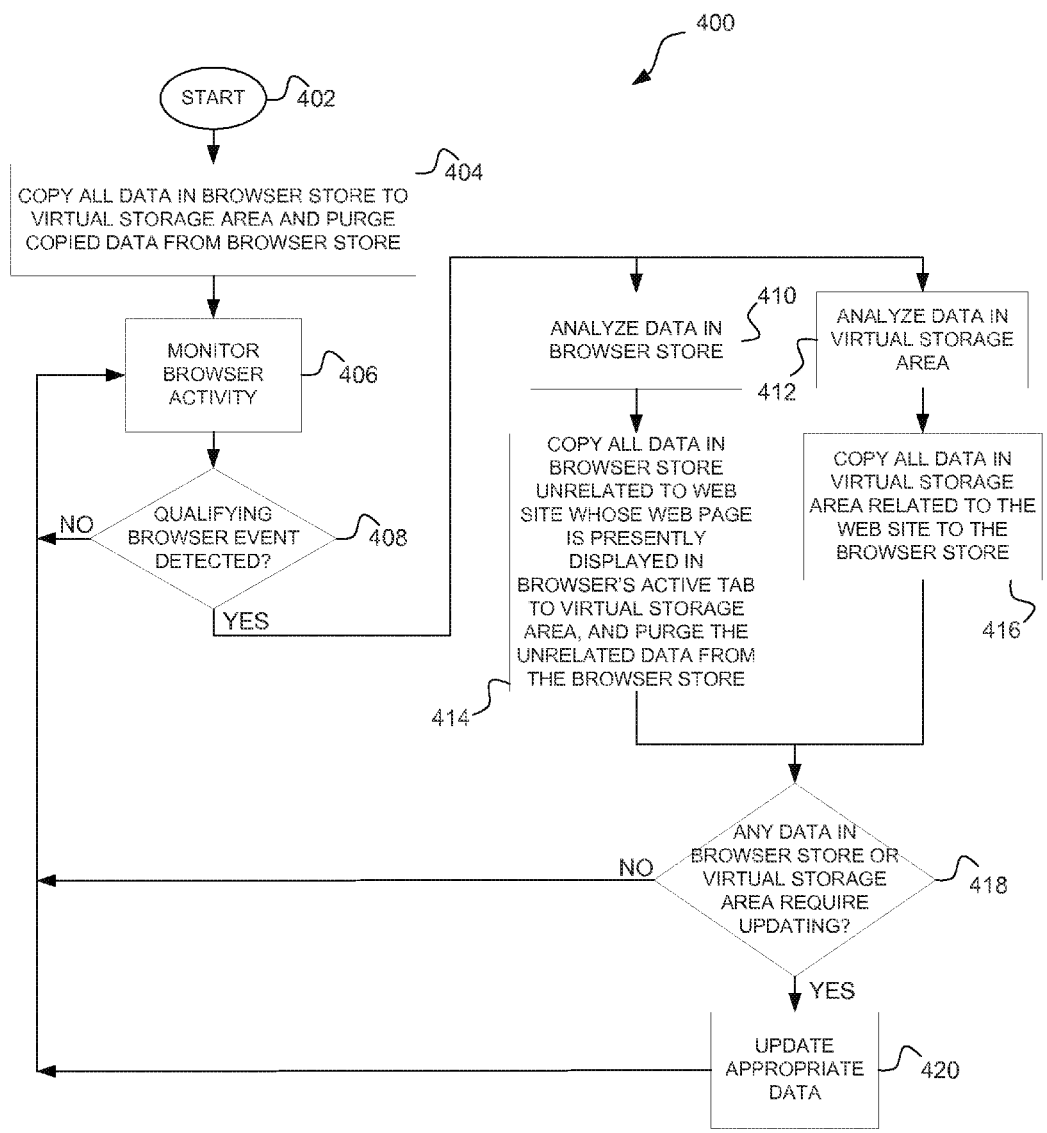
FIG. 4 is a flowchart showing an exemplary process implemented by a browser store administering system after it is installed onto a computing device, according to an embodiment of the present invention.

An example of process logic implemented by a browser store administering system after its installation onto a computing device is illustrated in FIG. 4 as process 400, which begins at step 402. At step 404, all data in the browser store is copied to a virtual storage area and then purged from the browser store. For example, administering system 150 can cause all data in browser store 104a to be copied to virtual storage area 104b and subsequently purged from the browser store. At step 406, the administering system monitors activity within the browser application. For example, administering system 150 can monitor activity within browser application 120, particularly browser window 121, using various event handlers described above. A decision is made at step 408 as to whether a qualifying browser event is detected. For example, administering system 150 can determine whether certain browser events have been detected (e.g., the creation of a new browser tab, a user selection of a particular tab to be active, a user request to access a web site URL via the active tab, etc.). If a qualifying browser event is detected, the process proceeds to steps 410 and 412, where the administering system causes data in the browser store and the virtual storage area to be analyzed. For example, administering system 150 can cause data in browser store 104a and virtual storage area 104b to be analyzed to distinguish data pertaining to the web site whose web page is presently displayed in the browser's active tab and data unrelated to the web site. If no qualifying browser event is detected, the process returns to step 406, where the administering system continues to monitor browser activity. At step 414, data in the browser store unrelated to the web site is copied to the virtual storage area and purged from the browser store. Additionally, at step 416, data in virtual storage area pertaining to the web site is copied or relocated to the browser store. For example, administering system 150 can cause data items unrelated to the web site to be copied to virtual storage area 104b and purged from browser store 104a, and additionally cause data items in virtual storage area 104b pertaining to the web site to be copied or relocated, to browser store 104a (e.g., as described above with respect to FIGS. 3c, 3d, and 3e). At step 418, a decision is made as to whether any data in the browser store or the virtual storage area requires updating. For example, administering system 150 can determine whether any data in browser store 104a or virtual storage area 104b are to be updated, e.g., as requested by the web server. If none of the data requires updating, the process returns to step 406. If any of the data requires updating, at step 420, the administering system can update the data accordingly, and the process returns to step 406.

By regulating the browser store during user browsing, the store can be advantageously reserved exclusively for the web site whose web page is presently displayed in the browser's active tab, and not for any other parties, such as third parties that may be partnered with the web site. That is, for example, any content (such as cookies) that a third party partnered with the web site may deposit into the browser store will be relocated to the virtual memory, and any such third party content will not be retrieved and returned to the browser store upon subsequent access to the web site by the browser application. In essence, any content whose domain information, for example, does not match the domain of the web site, will be cleared from the browser store, eliminating any possible use of that content to track user browsing activity.

As briefly described above, in various embodiments, administering system 150 can monitor browser-related activities and regulate the browser store in real-time. For example, administering system 150 can analyze each cookie prior to, during, and/or after it is deposited in browser store 104a. During typical user browsing sessions, a user may access many web pages via multiple browser tabs, and may occasionally switch from tab to tab. Each web site accessed via a tab may, as a background process, instruct the browser application to set and store data (such as cookies) in the browser store, regardless of whether the tab is active or not. Administering system 150 can regulate browser store 104a, such that, at any point during a browsing session, any data item set and stored in browser store 104a that does not correspond to the web site whose web page is currently presented in the browser's active tab (e.g., the data item's domain is not the same as the web site's domain), is automatically transferred to the virtual storage area 104b and purged from browser store 104a. This prevents web sites accessed via inactive tabs from clouding the browser store with its data.

Figure 5:
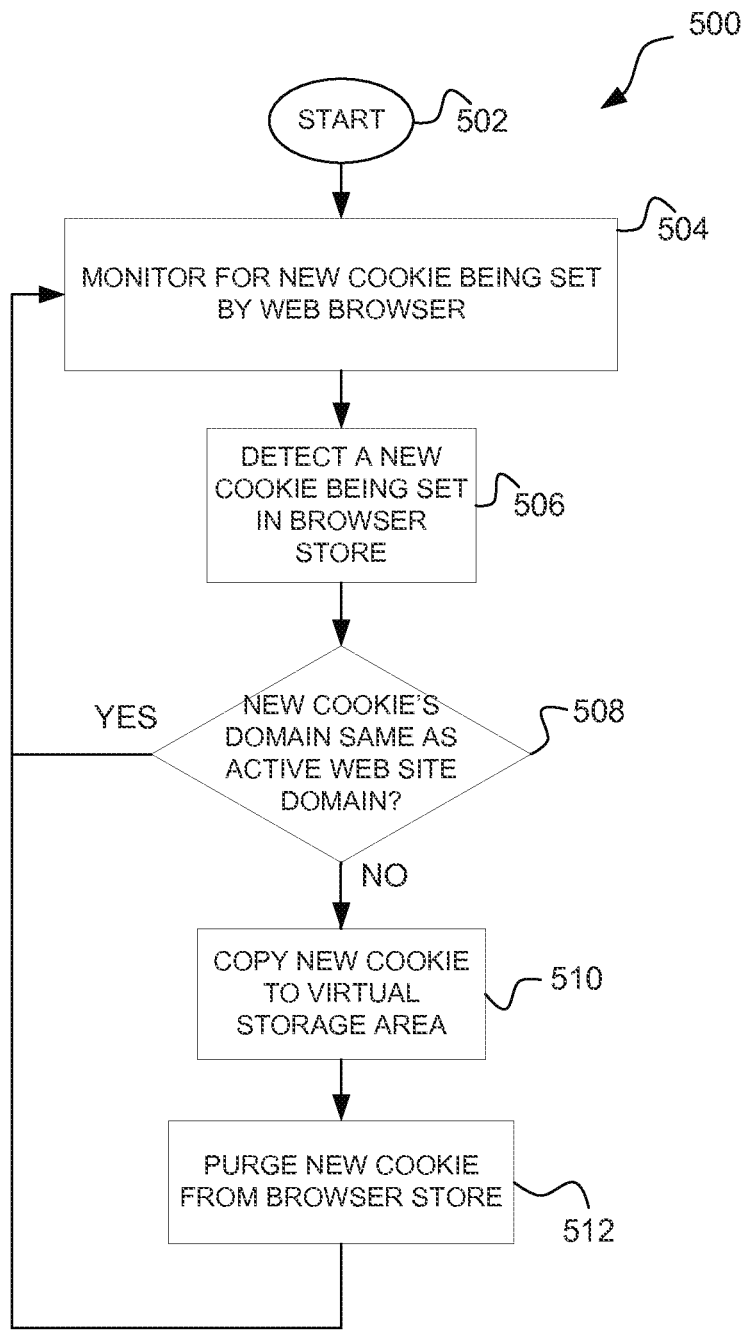
FIG. 5 is a flowchart showing another exemplary process implemented by a browser store administering system after it is installed onto a computing device, according to an embodiment of the present invention.

An example of process logic implemented by a browser store administering system (e.g., administering system 150) after its installation onto a computing device (e.g., computing device 100) is illustrated as process 500 in FIG. 5, beginning at step 502. At step 504, the administering system monitors for new cookies being set by the web browser. For example, administering system 150 can monitor (e.g., via monitoring module 152) for new cookies being set by web browser 120. At step 506, the administering system detects a new cookie being set by the web browser. For example, a user may have opened multiple browser tabs accessing multiple web sites. One or more sites accessed in the inactive tabs may request browser application 120 to set data (such as cookies) in browser store 104a. Administering system 150 can, at step 506, detect that web browser 120 has set a new cookie. At step 508, a decision is made as to whether the new cookie is associated with the same domain name as the web site accessed in the browser's active tab. If the new cookie is associated with the same domain name as the active web site, the process returns to step 504. If the new cookie is unrelated to the domain name of the active web site, it is copied, at step 510, to the virtual storage area and purged from the browser store at step 512.

It should be understood that the steps shown in processes 400 and 500 are merely illustrative and that existing steps may be modified or omitted, additional steps may be added, and the order of certain steps may be altered.

It should also be understood that the foregoing subject matter may be embodied as devices, systems, methods and/or computer program products. Accordingly, some or all of the subject matter may be embodied in hardware and/or in software (including firmware, resident software, microcode, state machines, gate arrays, etc.). Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be for example, an electronic, magnetic, optical, electro-magnetic, infrared, or semiconductor system, apparatus, device, or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

It will thus be seen that the objects set forth above, among those made apparent from the preceding description and the accompanying drawings, are efficiently attained and, since certain changes can be made in carrying out the above methods and in the constructions set forth for the systems without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method for administering a browser store for a web browser application on a computing device, wherein multiple web sites are accessible via individual tabs of the browser application, and in which the browser store is reserved exclusively for retaining auxiliary data corresponding to a domain or URL of a web site whose associated web page is displayed in an active tab of the individual tabs of the browser application, the method comprising:
   monitoring, using at least one data processor of the computing device, activity within the browser application;
   detecting, using the at least one data processor, at least one event in the browser application indicative of a need to regulate the browser store;
   identifying, using the at least one data processor, the web site whose web page is being displayed in the active tab of the browser application;
   purging, using the at least one data processor, auxiliary data in the browser store that does not correspond to the domain or URL of the web site whose web page is being displayed in the active tab; and
   retrieving from a virtual memory of the computing device and relocating to the browser store, using the at least one data processor, the auxiliary data corresponding to the domain or URL of the web site whose web page is being displayed in the active tab.

2. The method of claim 1, wherein monitoring activity within the browser application comprises monitoring user selection of at least one tab of the browser application.

3. The method of claim 1, wherein monitoring activity within the browser application comprises monitoring user requests to access URLs via at least one of the individual tabs of the browser application.

4. The method of claim 1, wherein the at least one event comprises at least one of: (i) a user selection of one of at least one tab of the browser application to be active and (ii) a user request to access a URL via the active tab.

5. The method of claim 1, further comprising copying the auxiliary data in the browser store that does not correspond to the domain or URL of the web site whose web page is being displayed in the active tab to the virtual memory prior to purging that data in the browser store.

6. The method of claim 1, wherein the auxiliary data corresponding to the domain or URL of the web site whose web page is being displayed in the active tab comprises at least one of cookies, multimedia content, and hypertext markup language data.

7. The method of claim 1, further comprising determining, using the at least one data processor, whether at least a portion of the data stored in at least one of the browser store and the virtual memory requires updating.

8. The method of claim 7, wherein determining whether at least a portion of the data stored in at least one of the browser store and the virtual memory requires updating comprises determining that at least one web site accessed via at least one tab of the individual tabs of the browser application provided the browser application with new information.

9. The method of claim 8, further comprising updating, using the at least one data processor, the at least one of the browser store and the virtual memory based on the new information.

10. The method of claim 1, wherein the computing device comprises one of a desktop computer, a laptop computer, a notebook computer, a tablet computer, a smartphone, and a personal digital assistant.

11. A computer program product comprising a non-transitory medium storing computer executable program logic for administering a browser store for a web browser application on a computing device, wherein multiple web sites are accessible via individual tabs of the browser application, and in which the browser store is reserved exclusively for retaining auxiliary data corresponding to a domain or URL of a web site whose associated web page is displayed in an active tab of the individual tabs of the browser application, the computer executable program logic configured to cause at least one data processor of the computing device to:
   monitor activity within the browser application;
   detect at least one event in the browser application indicative of a need to regulate the browser store;
   identify the web site whose web page is being displayed in the active tab of the browser application;
   purge auxiliary data in the browser store that does not correspond to the domain or URL of the web site whose web page is being displayed in the active tab; and
   retrieve from a virtual memory of the computing device and relocate to the browser store, the auxiliary data corresponding to the domain or URL of the web site whose web page is being displayed in the active tab.

12. A method for administering a browser store for a web browser application on a computing device having access to multiple web sites via individual tabs of the browser application, the method comprising reserving the browser store exclusively for retaining auxiliary data corresponding to a domain or URL of a web site whose associated web page is being displayed in an active tab of the browser application.

13. A method for administering a browser store for a web browser application on a computing device having access to multiple web sites via individual tabs of the browser application, the method comprising purging, using at least one data processor, all auxiliary data in the browser store that does not correspond to a domain or URL of a web site whose web page is being displayed in an active tab of the browser application.

* * * * *